United States Patent [19]

Wagner

[11] Patent Number: 4,822,579
[45] Date of Patent: Apr. 18, 1989

[54] DEVICE FOR THE DEACIDIFICATION OF WATER

[75] Inventor: Herbert H. Wagner, Augsburg, Fed. Rep. of Germany

[73] Assignee: Deutsche Perlite GmbH, Dortmund, Fed. Rep. of Germany

[21] Appl. No.: 94,333

[22] Filed: Sep. 8, 1987

[30] Foreign Application Priority Data

Sep. 8, 1986 [DE] Fed. Rep. of Germany ....... 3630538

[51] Int. Cl.$^4$ ................................................ C02F 1/66
[52] U.S. Cl. ..................................... 422/263; 210/170; 210/198.1; 422/265
[58] Field of Search ..................... 210/723–728, 210/716, 747, 170, 192, 198.1, 242.1, 484, 501, 506, 206; 137/268; 422/263, 265; 252/176; 106/75, 86, 87

[56] References Cited

U.S. PATENT DOCUMENTS

| | | | |
|---|---|---|---|
| 350,680 | 10/1886 | Hyatt | 252/176 |
| 1,944,008 | 1/1934 | Hobart | 106/75 |
| 2,072,976 | 3/1937 | Andrus | 210/723 |
| 2,328,573 | 9/1943 | Montgomery et al. | 106/75 |
| 2,934,409 | 4/1960 | Biehl | 23/267 |
| 3,483,989 | 12/1969 | Gopstein | 210/242 |
| 3,754,871 | 8/1973 | Hessel et al. | 422/263 |
| 3,957,501 | 5/1976 | Matsuda et al. | 106/75 |
| 4,133,754 | 1/1979 | Bory et al. | 252/176 |
| 4,483,713 | 11/1984 | Motoki | 106/75 |
| 4,692,314 | 9/1987 | Etani | 422/265 |
| 4,707,263 | 11/1987 | Nishimori et al. | 210/484 |

FOREIGN PATENT DOCUMENTS

| | | |
|---|---|---|
| 719003 | 3/1942 | Fed. Rep. of Germany . |
| 1119186 | 12/1961 | Fed. Rep. of Germany . |
| 1592133 | 10/1970 | Fed. Rep. of Germany . |
| 55-92190 | 7/1980 | Japan . |
| 55-142508 | 11/1980 | Japan ............................. 210/728 |
| 58-101789 | 1/1983 | Japan . |
| 58-292 | 6/1983 | Japan . |

Primary Examiner—Peter Hruskoci
Attorney, Agent, or Firm—Herbert Dubno

[57] ABSTRACT

A slow release alkali-reactive agent constitutes or is incorporated in floating bodies which are used to treat acid water for deacidification thereof.

13 Claims, 1 Drawing Sheet

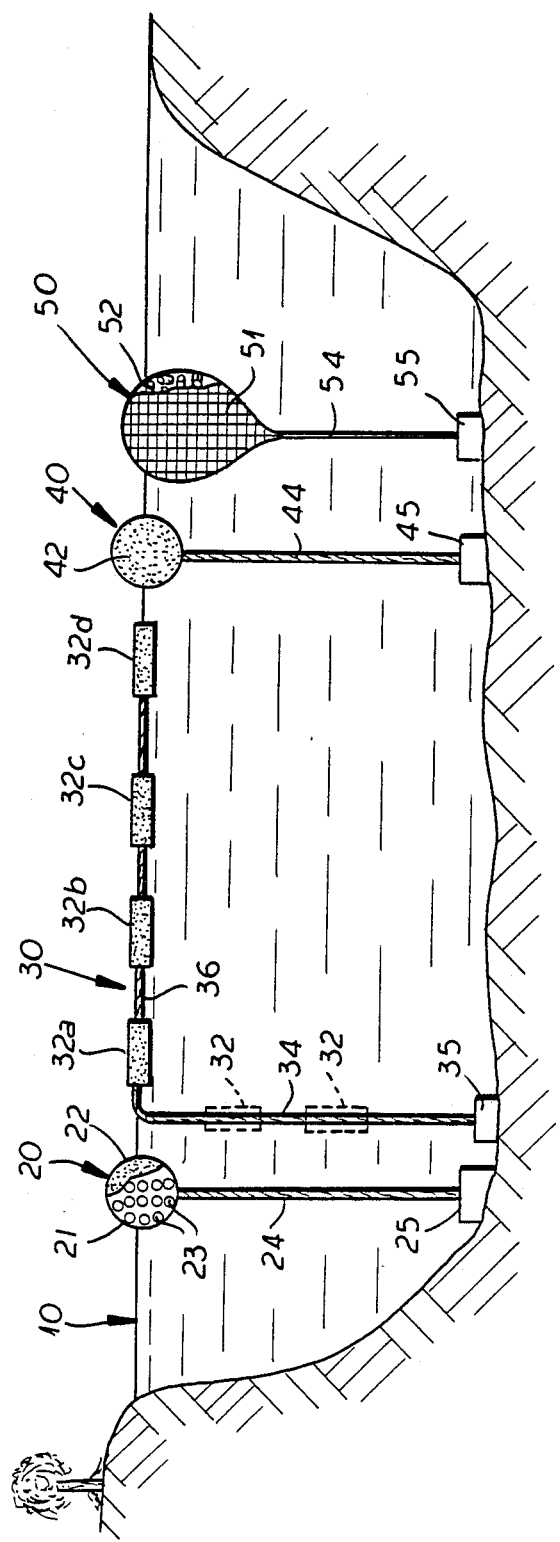

DEVICE FOR THE DEACIDIFICATION OF WATER

FIELD OF THE INVENTION

My present invention relates to a device for the deacidification of water by neutralization with a substance which is reactive in aqueous medium as an alkali, i.e. an alkali-reactive agent.

The invention also relates to a medium for the deacidification of water.

BACKGROUND OF THE INVENTION

The presence of sulfur oxides and nitrogen oxides in emissions from combustion, i.e. fossile-fuel electric power plants, metallurgical plants and chemical plants, give rise to acid rain which tends to progressively increase the acidity in lakes, flowing surface water and ground water.

To an increasing extent, the acidification of the water damages the biosphere since in acidified waters, the greater part of the normally present water organisms can no longer survive.

Measurements have shown that in many waters, the sulphate ion concentration has already reached levels of 30–60 mg/l, i.e. concentrations well below the bicarbonate buffer level, which is effective to a pH as low as 5.5. The natural geological concentration of sulfate ion is about 5 mg per liter. In acidified water, the lower bicarbonate buffer pH threshold is readily passed by the high sulfate ion concentration which can give rise to a state, below a pH of about 5.0 to the aluminum buffer range, in which the water is in equilibrium with aluminum ion at aluminum concentrations which are toxic, i.e. of 0.1 mg of aluminum per liter or more. Such aluminum contents are known to be toxic to fish populations.

Recent studies have shown that not only lakes and streams, but even ground water is increasingly endangered by acidification.

The danger of acidification of waters is also recognized to extend many years beyond the original sulfur and nitrogen oxide emissions.

Accordingly, it has been proposed to neutralize excessively acidic portions of the hydrosphere with powdered lime.

A wide-area liming of surface waters, however, can give rise to a massive attack on sensitive components of the hydrosphere.

In order to effect a reasonable degree of neutralization of acid water, very large amounts of lime must be used since lime, because of its high density, rapidly falls to the bottom of the body of water being treated and is lost in a sediment formation or because it binds in a sludge sediment so that at least a portion of the lime is rendered ineffective for neutralization.

As a consequence, amounts up to 25 metric tons of lime have been required per hectare of the water surface. This is very expensive.

It has already been suggested, moreover, to spread lime on bodies of water from airplanes and helicopters. This, however, appears to have an adverse effect on the living populations of the waters treated. Apart from a significant liberation of carbon dioxide, utilizing these spreading techniques, there can be local increases of the pH value which can be detrimental for many water organisms. For example, there are sensitive breeds of fish which will be affected in this manner. As a matter of fact, there are few water-dwelling organisms which can tolerate a deviation from a pH range of 6 to 8.

Problems have been encountered in the use of metallurgical lime with its high calcium oxide content for the deacidification of waters. It appears that the calcium oxide reacts with water highly exothermally to liberate large amounts of heat which can also be detrimental.

It may be noted that it is not only the low pH which is detrimental to water-dwelling organisms, but that the increasing acidity is generally associated with increasing concentrations of nitrogen compounds in the water, especially from fertilizers, of cyanide compounds in the water, especially from metallurgical plants and electroplating plants, and increasing concentrations of chlorine and metal salts, from a variety of sources, especially iron, manganese, mercury and cadmium salts.

OBJECTS OF THE INVENTION

It is therefore the principal object of the present invention to provide an improved device for the treatment of acid waters which will avoid the aforedescribed drawbacks and can be used at low cost and with a maximum protection of water-dwelling organisms, especially for lakes and streams and which will also have the effect of eliminating detrimental ions.

Another object of my invention is to provide an improved method of treating bodies of water to avoid acidification or to deacidify them.

SUMMARY OF THE INVENTION

These objects are obtained, in accordance with the present invention in a device for the deacidification of water by neutralizing the water with an agent which is alkali reactive in aqueous medium, said device comprising a body of a specific gravity enabling it to float in the water and consisting at least in part of said alkali-reactive agent therein in a slowly solubilizing form.

In its method aspect, the invention comprises floating in the water to be deacidified at least one body of a specific gravity enabling it to float in the water and consisting at least in part of said alkali-reactive agent and gradually dissolving the alkali reactive agent from said body into the water.

It is important for the purposes of the invention that the body is floatable and slowly releases the substance which is alkali reactive in the aqueous medium, into the water so that local over-alkalization does not occur and also so that the alkali-reactive agent is not lost by sediment formation.

The device of the invention can comprise cylinders of appropriate optional size which can be positioned at optional locations in the body of the water to be deacidified and can be anchored and to release the alkali substance slowly in accordance with the principal of a so-called tea ball or like perforated containers containing tea leaves which can be immersed in a hot liquid to form an infusion beverage. A slow neutralization is thus ensured.

Advantageously, the floatable body can be porous, its porosity serving to bring the material from which it is constituted, usually of a specific gravity greater than 1, into a form in which the specific gravity of the body is 1 or less so that the body will float in water.

The floatable body of the invention can be composed exclusively of the alkali-reactive substance which is slowly soluble in the water. Since such substances practically always have a specific gravity in excess of 1 and thus would tend to sink, the body formed from such material must be made floatable by the formation of pores therein.

For example, when the alkali-reactive substance is waterglass, substances capable of liberating gas, such as dicarbonates and carbonates can be fused together with the waterglass in a melt, from which the body is solidified so that a foam is form on or during solidification. Alternatively, it is possible to combine nonfoamed alkali-reactive agents with floatable matrrials in the body although this approach is less preferred.

In a preferred embodiment of the invention, the floatable body can comprise a porous carrier which may be provided with the alkali-reactive agent by impregnation, i.e. with a solution of the alkali-reactive agent and then treated to charge the porous carrier with the alkali-reactive agent. The porous carrier can consist of an expanded igneous mineral such as perlite.

The porous floating bodies of the invention can also be fabricated by mixing porous carrier particles (e.g. of perlite) with an alkali-reactive agent in solid form or in the form of a solution, optionally together with a binder, whereupon the mixture is shaped, e.g. by pressing, and dried to the lowest possible residual content, for example 4 to 5% by weight to avoid efflorescence of the alkali-reactive agent of the resulting bodies.

The porous particles, can be perlite particles, particles of micronized chalk or foamed glass. The latter can be fabricated from scrap glass which can be ground to a microfine state, granulated and sintered into which porous state at a temperature in excess of 1000 C.

The binder can, for example, be constituted from calcium sulfate (gypsum) which is recovered in large quantities from flue gases of fossil-fuel electricity-generating power plants and constitutes a hydraulic binder capable of binding the porous carrier particles to a solid soluble unit. Any other hydraulic binder which in the bonded state is water insoluble can be used, the lack of solubility preventing the release of undesired ions into the water.

The alkali-reactive agent is preferably waterglass, i.e. sodium or potassium trisilicate which can be used in liquid or solid form and dissolves slowly in water to effect neutralization therein.

When the floating body consists of porous, e.g. perlite particles, calcium sulfate as a binder and waterglass, it is advantageous to add a protective colloid to the mixture to be pressed to prevent an immediate reaction of the gypsum with the waterglass. The protective colloid is preferably carboxymethylcellulose. This protective colloid also serves to increase the pot life of the liquid mixture.

To improve the flowability of the mixture, casein can be added thereto, especially in the form of an alkali-soluble mixture of the phosphoproteins which precipitate from cows' milk at a pH of 4.

An especially effective form of the waterglass is sodium trisilicate in the form of balls which are especially slowly soluble in water.

Finally, it is also possible to fabricate the floating bodies of the invention by charging porous carrier particles with the alkali reactive substance and holding them in a sieve-screen or other perforated enclosure.

I also find it to be advantageous to fabricate floating bodies for use in accordance with the invention from a mixture of the binder and the alkali-reactive substance, for example a gypsum/silicate mixture, by adding an expanding agent such as sodium bicarbonate or ammonium bicarbonate thereto, this mixture being combined with water, and if desired, a protective colloid such as cellulose.

The mixture is then pressed in forms and heated to liberate carbon dioxide which blows the passed bodies to porous structures and makes them floatable.

To accelerate the carbon dioxide development, an acid reactive salt or an acid, e.g. acid sodium biphosphate, preferably in a 1% solution, can be added.

The advantage of the use of such acid phosphate salts is they improve the flowability of the mixture promoting its casting and at the same time ensure that the body will be somewhat hydrophobic, thereby further reducing the speed of dispersion of the alkali-reactive agent in the water.

The mixture of porous carrier particles, binder and alkali-reactive substances can be combined, in addition, with magnesium oxide and/or calcium oxide (preferably magnesium oxide) which ensures that the formation of magnesium silicate in the water. The latter compound serves as an oxygen stabilizer in the water treated. Furthermore, the magnesium oxide provides a significant buffer capacity in that it is practically insoluble in water at a neutral pH but is effective to neutralize acid waters.

The drying of the water containing mixtures to floating bodies, especially the final drying steps can be effected with microwave heating. Microwave heating has the advantages over hot air drying that it is less costly and, in addition, the steam generated by the internal microwave heating can be used to promote the foaming action.

When relatively small bodies are to be made for retention in a water permeable enclosure, they preferably are in the shape of cylinders of a height of 2 cm and a diameter of 1.5 cm. After fabrication, these bodies can be subjected to further hardening and to a process which increases the hydrophobic character, which may involve treatment with carbon dioxide gas or an acid.

The floating bodies of the invention can be utilized for the deacidification of static waters, flowing waters, wells or springs, water circulation systems, clarifier basins, filter basins and flow through vessels. The bodies can float freely or can be held by cables, screens, nets or the like.

By a corresponding choice of the alkali-reactive substance, the binder, the porous carrier and the charging and hardening conditions, I am able to vary over a wide range the rate which the alkali-reactive substances will be liberated and hence the rate of neutralization.

If one wishes to provide a rapidly effective floating body, a pressed body without a binder may be used. Such a body will decompose relatively rapidly in the water and release, because of the resulting increase in available surface area, its alkali-reactive agent more rapidly. A mixture for rapid action can be a dry mixture of chalk, gypsum and waterglass which is pressed into appropriate shape, e.g. cylinders.

BRIEF DESCRIPTION OF THE DRAWING

The above and other objects, features and advantages of my invention will become more readily apparent from the following description, reference being made to the accompanying highly diagrammatic drawing the sole FIGURE of which is a cross section through a body of water, e.g. a pond, which can be treated for excess acidification of the water.

SPECIFIC DESCRIPTION

In the drawing, I have shown a pond 10.

A floating body 20 comprises a perforated shell 21 surrounding a pressed spherical body 22 which is porous and contains the waterglass. This alkali-reactive substance is leached from the body through the perforations 23 in the shell or casing 21. The floating body is held in place by a cable 24 attached to an anchor 25 such as a weight block.

At another location in the pond, a plurality of floating bodies 32a, 32b, 32c and 32d, in the form of cylinders of a porous mass containing the slow-release alkali-reactive agent collectively form the device 30 for deacidification of the pond. The cylindrical bodies 32a–32d are fixed to a flexible cable 36 which has a length 34 connected to the anchor 35. This length may also be provided with bodies 32' and 32" which also contain the alkali-reactive agent and themselves also are of a specific gravity which is less than 1.

The device 40 comprises a sphare 42 of the porous mass which contains the waterglass. The porous mass is attached to the cable 44 and by the cable to the anchor 45.

Finally, the device 50, which is used in another part of the pond, can comprise a net composed of fabric 51 and confining the floating cylinders 52 which can be fabricated in the manner described and contain the alkali-reactive agent. The net 51 is held in place by the cable 54 connected to the anchor 55.

SPECIFIC EXAMPLES

Example 1

A mixture is formed from the following components: 2500 kg calcium sulphate, 500 kg micronized chalk, 2000 liters of foamed glass particles of a diameter of 1 to 2 mm, and 500 kg of sodium trisilicate.

This powder mixture is formed in a mold into a shaped body, e.g. the sphere 42, as previously described to form a quick release body. Another quantity of the same material, with the addition of a mixture of water, cellulose and waterglass, is shaped into cylinders and dried for use in the device 50.

Example 2

The following components are combined to form a mixture; 300 kg calcium sulphate (gypsum), 800 liters perlite particles treated to be hydrophobic, 100 kg magnesium oxide, 50 kg sodium trisilicate in the form of balls, 10 liters of 4% carboxymethyl cellulose and sufficient water to allow the mixture to be easily blended and shaped.

The mixture is shaped in molds into cylindrical bodies of a height of 2 cm and a diameter of 1.5 cm. The bodies were found to be porous and could be used in the device shown in 20 in the drawing.

In another test using the same composition, ammonium bicarbonate was added as a blowing aent. Upon drying of the bodies carbon dioxide was released and and there was an increase in the number of pores. The bodies were used in the device 50.

I claim:

1. A solid body for the deacidification of water by neutralizing the water with an agent which is alkali-reactive in aqueous medium, said solid body having a specific gravity enabling it to float autonomously in the water and consisting essentially of water glass which has been made floatable by the formation of said water glass into a porous solid body to achieve a specific gravity of the body of 1 or less and has been made to dissolve slowly in said water to deacidfy said water.

2. The body defined in claim 1 wherein said water glass is a substance which has been formed in a melt.

3. The body defined in claim 1 wherein said water glass is a sodium or potassium trisilicate.

4. The body defined in claim 1 wherein said body is held in a sieve-screen.

5. A solid body for the deacidification of water by neutralizing the water with an agent which is alkali-reactive in aqueous medium, said solid body having a specific gravity enabling it to float autonomously in the water and consisting essentially of a pressed mixture of porous-carrier particles charged with water glass, wherein the specific gravity of said solid body being 1 or less, wherein said water glass dissolves slowly in said water to deacidfy said water.

6. The body defined in claim 5 wherein said body is comprises of a mixture of porous particles and particles of said water glass.

7. The body defined in claim 6 wherein said mixture further comprises a binder.

8. The body defined in claim 7 wherein said binder is calcium sulfate or a hydraulic binder.

9. The body defined in claim 5 wherein said porous carrier has been charged with the water glass by impregnation.

10. The body defined in claim 5 wherein said porous carrier is made from a material from the group consisting of perlite particles, particles of micronized chalk, foamed glass, and mixtures thereof.

11. The body defined in claim 5 wherein said waterglass is a sodium or potassium trisilicate.

12. The body defined in claim 5 wherein said water glass has been formed in a melt.

13. The body defined in claim 5 wherein said body is held in a sieve-screen.

* * * * *